UNITED STATES PATENT OFFICE.

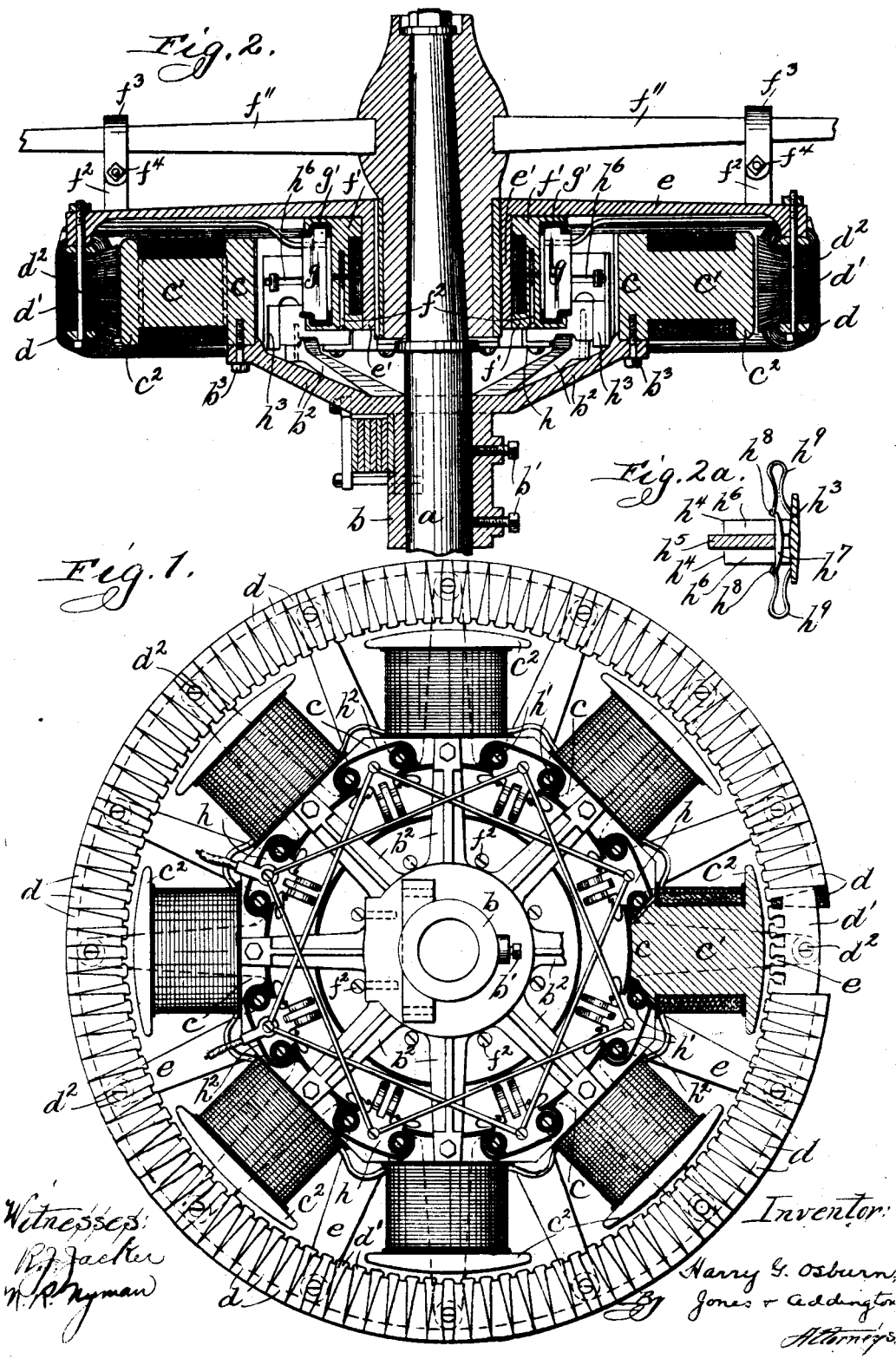

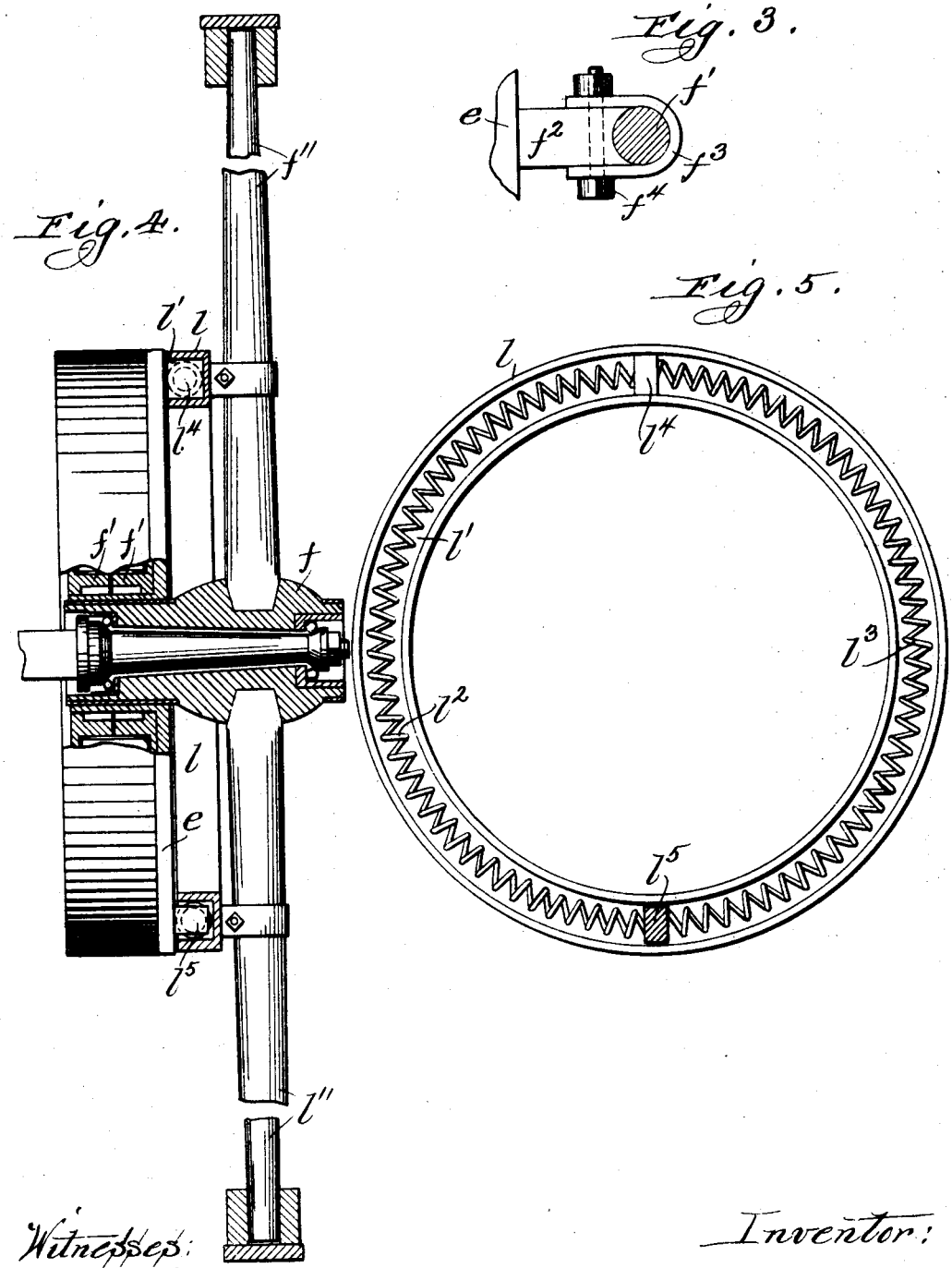

HARRY G. OSBURN, OF HOBOKEN, NEW JERSEY.

ELECTRIC MOTOR FOR VEHICLES.

SPECIFICATION forming part of Letters Patent No. 711,520, dated October 21, 1902.

Application filed May 6, 1901. Renewed March 17, 1902. Serial No. 98,455. (No model.)

*To all whom it may concern:*

Be it known that I, HARRY G. OSBURN, a citizen of the United States, residing at Hoboken, in the county of Hudson and State of New Jersey, have invented a certain new and useful Improvement in Electric Motors for Vehicles, of which the following is a full, clear, concise, and exact description, reference being had to the accompanying drawings, forming a part of this specification.

My invention relates to an electric motor for vehicles, my object being to provide a direct-connected motor the stationary element of which is mounted upon the frame of the vehicle, while the rotatable element is mounted directly upon the driving-wheel.

My invention is particularly applicable to horseless carriages and vehicles, and in accordance with my invention in the preferred form thereof an electric motor is provided the field-magnet of which is of annular form and supported upon the frame of the vehicle, while the armature is mounted directly upon the driving-wheel, the armature-coils being arranged to rotate around the outer periphery of the annular field-magnet, while the commutator and current-collecting devices are placed in the annular space between the inner periphery of the field-magnet and the hub of the driving-wheel of the vehicle. Two motors may be provided upon each vehicle, one motor in connection with each of the rear wheels of the vehicle.

I have illustrated my invention in the accompanying drawings, in which—

Figure 1 is a view of the motor in elevation. Fig. 2 is a sectional view thereof. Fig. 2$^a$ is a sectional view of the brush-holder. Fig. 3 is a view of the device for fastening the armature of the motor to the spoke of the wheel. Fig. 4 is a view of a modification wherein a resilient connection is provided between the wheel and the armature of the motor. Fig. 5 is a detailed view of the resilient connection.

Like letters refer to like parts in the several figures.

Upon the rear axle $a$ of the vehicle a spider is provided, having a boss $b$, fitting over the axle and secured thereto by set-screws $b'$ $b'$ or other suitable fastening devices, the arms $b^2$ $b^2$ of the spider supporting upon their ends the annular field-magnets $c$, screws $b^3$ $b^3$ being passed through the ends of the arms $b^2$ and engaging the field-magnet to secure the same in position. A series of cores $c'$ $c'$ extend outward from the annular portion of the field-magnet, and pole-pieces $c^2 c^2$ are provided upon the ends thereof. The armature-coils $d$ $d$ are mounted upon a ring-core $d'$, which is supported, by means of bolts $d^2$ $d^2$, upon the spider $e$, provided with a boss $e'$, which is keyed or otherwise secured to the hub $f$ of the vehicle-wheel. Upon the boss $e'$ a pair of rings $f'$ $f'$ are mounted, and between the inner faces of the rings the commutator-bars $g$ $g$ are clamped, pieces of insulation $g'$ $g'$ being interposed between the ends of the commutator-bars and the faces of said rings. The rings are clamped together by means of the screw $f^2$. Upon the face of the ring $c$ of the field-magnet a series of brush-holders are mounted, each holder comprising a plate $h$, secured to the ring $c$ by screws $h'$ $h'$, a strip of insulation $h^2$ being interposed between said plate and the field-magnet ring. Upon the plate are carried the arms $h^3$ $h^3$, which extend into the space between the commutation-bars and the inner periphery of the field-magnet, and upon the ends of these arms plates $h^4$ $h^4$ are provided, between which the brush $h^5$ is adapted to slide. The plates $h^4$ are cut away in front to form semicircular openings whereby the brush may be grasped when it is desired to remove the same. A slot $h^6$ is provided in each of the plates $h^4$, and a plate $h^7$ rests upon the top of the brush and is provided with a pair of lugs $h^8$, one extending through each of the slots $h^6$ on opposite sides of the brush. A spring $h^9$ engages lug $h^8$ by one end and engages the plate $h^4$ at the other end, whereby the brush is yieldingly pressed into contact with the commutator-bars.

The spider $e$ is connected with the spokes $f^{11}$ of the driving-wheel at intervals, preferably by means of a bracket $f^2$, mounted upon the spider and having a strap $f^3$ encircling the spoke and secured to the bracket by means of a bolt $f^4$.

In Figs. 4 and 5 I have illustrated a modification wherein the armature of the motor instead of being rigidly mounted upon the vehicle-wheel is connected therewith through the intermediation of a resilient connection. The armature of the motor, instead of being keyed to the hub of the wheel, is rotatably mounted thereon, and upon the wheel is mounted a casing $l$, provided with an annular channel $l'$, within which coiled springs $l^2$ $l^3$ are adapted to rest, one end of each spring resting against an abutment $l^4$, provided upon the casing $l$, while the opposite ends of the springs rest against the lug $l^5$, carried upon the spider, which supports the armature of the motor, said lug being free to move within the annular channel. The armature of the motor may thus partake of a movement relatively to the wheel, the springs $l^2 l^3$ yieldingly accommodating its movement due to the engagement of the lug $l^5$ with the ends of said springs. In starting the armature of the motor is thus permitted to partake of a limited rotation before the load is imposed thereon, whereby an initial torque may be developed to facilitate the starting of the vehicle.

Having described my invention, what I claim as new, and desire to secure by Letters Patent, is—

1. In an electric vehicle, the combination with an axle, of a wheel journaled thereon and having a laterally-extending hub, the stationary element of an electric motor carried upon the frame of the vehicle and the rotatable element of the motor supported on the hub of said wheel and secured to the outer portion thereof, substantially as described.

2. In an electric vehicle, the combination with an axle, of a wheel journaled thereon and having a laterally-extending hub the field-magnet of an electric motor supported upon the frame of the vehicle, a spider mounted upon the hub of said wheel and connected with the spokes thereof, and armature-coils supported upon said spider, substantially as described.

3. In an electric vehicle, the combination with a field-magnet supported upon the frame of the vehicle, of the vehicle-wheel, and armature-coils supported on said wheel and arranged to rotate about the exterior of said field-magnet, and a commutator rotating upon the interior of said annular field-magnet and having the segments thereof connected with said exteriorly-rotating armature-coils, substantially as described.

4. In an electric vehicle, the combination with the axle and a wheel journaled thereon having a laterally-extending hub, of an annular field-magnet supported on the frame of said vehicle, armature-coils mounted upon said wheel and arranged to rotate about the exterior of said magnet and a commutator between the interior of said field-magnet and the hub of said wheel, substantially as described.

5. In an electric vehicle, the combination with an axle, of a wheel having a hub journaled thereon, an annular field-magnet, a spider mounted upon the hub of said wheel, armature-coils carried on said spider and arranged to rotate about the exterior of said field-magnet, and a commutator carried upon said hub and rotating upon the interior of said field-magnet, substantially as described.

6. In an electric vehicle, the combination with an axle, of a wheel having a hub journaled thereon, a spider having a boss, fitting over said hub, a field-magnet supported upon the frame of the vehicle, armature-coils supported upon said spider and rotating about the exterior of said field-magnet and a commutator mounted upon said boss and situated between the same and the interior face of the field-magnet, substantially as described.

7. In an electric vehicle, the combination with a wheel and the axle upon which the same is journaled, of an annular field-magnet, armature-coils carried upon the wheel and rotating about the exterior of said field-magnet, a commutator rotating upon the interior of said field-magnet, and brushes and holders therefor situated between the commutator and the field-magnet and arranged to permit the removal of the brushes laterally, substantially as described.

8. In an electric vehicle, the combination with the axle, $a$, and the wheel having the hub, $f$, journaled thereon, of the annular field-magnet, the spider having a boss, $e'$, mounted upon the hub of said wheel, fastening devices for connecting said spider with the spokes of the wheel, the rings, $f'$ $f'$ mounted upon the said boss, and the commutator-segments, $g$, supported thereby, substantially as described.

9. In an electric vehicle, the combination with an axle, of a wheel having the hub journaled thereon, a spider rotatably mounted on said hub, a resilient connection between said spider and the wheel and an electric motor having one element supported upon the body of the vehicle and the other upon said spider, substantially as described.

10. In an electric vehicle, the combination with an axle, of a wheel having the hub journaled thereon, a spider journaled to rotate about said hub, a circular channel-bar carried upon said wheel, springs supported in said channel-bar having one end engaging a part carried upon said spider, and the other engaging a part carried upon said wheel, and an electric motor having one element mounted upon the body of the vehicle and the other element carried upon said spider, substantially as described.

11. In an electric vehicle the combination with an axle, of a wheel having the hub journaled thereon, a spider journaled to rotate about said hub, an annular field-magnet supported upon the frame of the vehicle, armature-coils supported upon said spider and rotating about the exterior of said field-magnet, a commutator supported upon said spider and rotating on the interior of said field-magnet, and a resilient connection between said spider and said wheel permitting the spider to yieldingly move relatively to the wheel, substantially as described.

12. In an electric vehicle, the combination with the stationary element of an electric motor, of a wheel and the rotatable element of an electric motor mounted upon said wheel and arranged to rotate about the exterior of said stationary element, and a commutator rotating within the interior of said stationary element and having segments connected with windings carried upon said rotating element, substantially as described.

13. In an electric vehicle, the combination with an annular field-magnet supported upon the frame of the vehicle, of a vehicle-wheel, an armature supported thereon and arranged to rotate about the exterior of said field-magnet, and a commutator supported upon said wheel and arranged to rotate within the interior of said magnet and having segments connected with the windings of said armature, substantially as described.

14. In an electric vehicle, the combination with an annular field-magnet supported upon the frame of the vehicle, of a vehicle-wheel, the armature of the motor supported upon said wheel and arranged to rotate about the exterior of said field-magnet, a commutator carried upon the wheel and arranged to rotate within the interior of said field-magnet, and brushes bearing upon said commutator and situated in the space between the commutator and the interior face of the field-magnet, substantially as described.

In witness whereof I have hereunto subscribed my name in the presence of two witnesses.

HARRY G. OSBURN.

Witnesses:
W. CLYDE JONES,
PHILIP WM. GRECE.